US012680358B2

(12) United States Patent
Schuler

(10) Patent No.: US 12,680,358 B2
(45) Date of Patent: Jul. 14, 2026

(54) FITTING FOR MOVABLY MOUNTING A PIVOTING ELEMENT

(71) Applicant: Julius Blum GmbH, Hoechst (AT)

(72) Inventor: Thomas Schuler, Hard (AT)

(73) Assignee: JULIUS BLUM GMBH, Hoechst (AT)

( * ) Notice: Subject to any disclaimer, the term of this patent is extended or adjusted under 35 U.S.C. 154(b) by 0 days.

(21) Appl. No.: 18/673,654

(22) Filed: May 24, 2024

(65) Prior Publication Data

US 2024/0318482 A1 Sep. 26, 2024

Related U.S. Application Data

(63) Continuation of application No. PCT/AT2022/060410, filed on Nov. 22, 2022.

(30) Foreign Application Priority Data

Nov. 26, 2021 (AT) ................................. 50947/2021

(51) Int. Cl.

*E05F 1/08* (2006.01)
*E05D 7/12* (2006.01)
*E05F 5/00* (2017.01)

(52) U.S. Cl.

CPC .............. *E05D 7/123* (2013.01); *E05F 5/006* (2013.01); *E05Y 2900/20* (2013.01)

(58) Field of Classification Search

CPC ... E05F 1/08; E05F 1/10; E05F 1/1041; E05F 1/1091; E05F 1/12; E05F 1/1223;

(Continued)

(56) References Cited

U.S. PATENT DOCUMENTS 7,552,509 B2 * 6/2009 Chen ........................ E05F 5/006 16/50
9,163,447 B1 * 10/2015 Liang ...................... E05F 5/006

(Continued)

FOREIGN PATENT DOCUMENTS

AT 506 903 12/2009
CN 106869661 6/2017

(Continued)

OTHER PUBLICATIONS

International Search Report issued Feb. 7, 2023 in International (PCT) Application No. PCT/AT2022/060410.

*Primary Examiner* — Chuck Y Mah
(74) *Attorney, Agent, or Firm* — Wenderoth, Lind & Ponack, L.L.P.

(57) ABSTRACT

A fitting for movably mounting a pivoting element of a door or a window relative to a stationary support, includes a first substantially cuboid-shaped fitting part to be arrangeable substantially completely in a recess on an end face of a panel of the support, and a second fitting part for securing to the pivoting element, the second fitting part being pivotally connected to the first fitting part. The second fitting part can be arranged substantially completely in the pivoting element. A damping device damps a pivoting movement of the two fitting parts relative to each other. The damping device can be converted from a first damping position into a second damping position with a reduced damping performance relative to the first damping position, and the damping device is arranged in the first fitting part. A securing device is provided for holding the damping device in the second damping position.

34 Claims, 7 Drawing Sheets

(58) Field of Classification Search

CPC ..... E05F 1/1246; E05F 1/1253; E05F 1/1261; E05F 1/1292; E05F 1/14; E05F 5/006; E05F 5/02; E05F 5/027; E05F 5/06; E05F 8/10; E05F 3/20; E05F 3/18; E05D 7/123; E05D 11/1021; E05D 3/12; E05D 3/14; E05D 3/16; E05D 11/10; E05D 15/40; E05D 15/401; E05D 15/405; E05D 15/406; E05D 15/42; E05D 15/58; E05D 15/565; E05D 3/142; E06B 3/5045; E05Y 2800/22; E05Y 2900/20; E05Y 2900/202; E05Y 2900/208; E05Y 2900/21; E05Y 2201/21; E05Y 2201/264; E05Y 2201/212; E05Y 2201/604; E05Y 2201/626; E05Y 2600/41

See application file for complete search history.

(56) References Cited

U.S. PATENT DOCUMENTS

| | | | | |
|---|---|---|---|---|
| 9,523,228 | B2 | 12/2016 | Krammer et al. | |
| 9,611,682 | B2 | 4/2017 | Forster et al. | |
| 10,458,168 | B2 | 10/2019 | Hammerer | |
| 11,306,527 | B2 | 4/2022 | Folie et al. | |
| 11,401,745 | B2 | 8/2022 | Capur et al. | |
| 11,486,176 | B2 | 11/2022 | Duer | |
| 11,486,180 | B2 | 11/2022 | Capur et al. | |
| 2003/0229965 | A1* | 12/2003 | Wang | E05D 3/142 16/54 |
| 2006/0220284 | A1 | 10/2006 | Holzapfel | |
| 2011/0019946 | A1 | 1/2011 | Krammer | |
| 2011/0067964 | A1 | 3/2011 | Krammer et al. | |
| 2013/0145580 | A1* | 6/2013 | Brunnmayr | E05F 5/02 16/84 |
| 2015/0068126 | A1 | 3/2015 | Forster et al. | |
| 2017/0044812 | A1 | 2/2017 | Schluge | |
| 2017/0152694 | A1* | 6/2017 | Chen | E05F 5/006 |
| 2018/0087307 | A1 | 3/2018 | Hammerer | |
| 2018/0100339 | A1 | 4/2018 | Kirenci et al. | |
| 2018/0291665 | A1* | 10/2018 | Güzeltepe | E05D 15/401 |
| 2020/0362612 | A1* | 11/2020 | Nordieker | E05D 3/16 |
| 2021/0087867 | A1 | 3/2021 | Folie et al. | |
| 2021/0115714 | A1 | 4/2021 | Duer | |
| 2021/0148150 | A1 | 5/2021 | Capur et al. | |
| 2021/0277698 | A1 | 9/2021 | Capur et al. | |
| 2022/0275671 | A1 | 9/2022 | Salice | |
| 2022/0307309 | A1* | 9/2022 | Hirtsiefer | E05F 1/105 |

FOREIGN PATENT DOCUMENTS

| | | | | | |
|---|---|---|---|---|---|
| CN | 107532444 | A | * | 1/2018 | E05D 7/0423 |
| CN | 110905324 | | | 3/2020 | |
| CN | 211691975 | | | 10/2020 | |
| DE | 20 2006 006 422 | | | 9/2006 | |
| DE | 20 2012 003 508 | | | 8/2013 | |
| DE | 10 2015 106 919 | | | 11/2016 | |
| EP | 1217159 | A2 | * | 6/2002 | E05F 5/10 |
| IT | MI20100555 | | | 10/2011 | |
| JP | 2009-092247 | | | 4/2009 | |
| JP | 2011-517477 | | | 6/2011 | |
| JP | 2011-521129 | | | 7/2011 | |
| JP | 2017-515018 | | | 6/2017 | |
| JP | 2020523508 | A | * | 8/2020 | E05F 3/20 |
| WO | 2016/201462 | | | 12/2016 | |
| WO | 2018/147817 | | | 8/2018 | |
| WO | 2020/006588 | | | 1/2020 | |
| WO | 2020/006589 | | | 1/2020 | |
| WO | 2020/009671 | | | 1/2020 | |
| WO | 2021/023587 | | | 2/2021 | |

* cited by examiner

FITTING FOR MOVABLY MOUNTING A PIVOTING ELEMENT

BACKGROUND OF THE INVENTION

The invention relates to a fitting for movably mounting a pivoting element, in particular a furniture part, a door or a window, relative to a stationary support.

Such fittings are already known from the state of the art, for example from the applicant's own AT 506 903. The disadvantage is that a relatively complicated mechanism is needed in order to be able to transfer a damping device from a first damping position into a second damping position with a reduced damping performance relative to the first damping position. For one thing, this is associated with a higher production effort and higher production costs. For another, a complex mechanism is also more prone to defects.

Moreover, the development of using fittings which as far as possible are not visible or only slightly visible to a user in the installed state is becoming increasingly apparent. This is achieved for example in that the fitting parts of a fitting are arranged as far as possible completely in the stationary element or in the pivoting element. The design of such fittings means that it is not possible to use a device according to the state of the art to transfer a damping device from a first damping position into a second damping position with a reduced damping performance relative to the first damping position.

SUMMARY OF THE INVENTION

The object of the present invention is to at least partially avoid the described disadvantages according to the state of the art, and to specify a fitting, improved compared with the state of the art, for movably mounting a pivoting element, in particular a furniture part, a door or a window, relative to a stationary support, as well as a piece of furniture with such a fitting.

Thus, it is accordingly provided that the damping device can be transferred from a first damping position into a second damping position with a reduced damping performance relative to the first damping position. The damping device is arranged in the first fitting part, and a securing device is provided for holding the damping device in the second damping position.

According to a preferred embodiment, the damping device has an engagement element and the securing device has a securing element, and the securing element can be arranged in a release position, in which the securing element is at a distance from the engagement element, and in a securing position, in which the securing element is in engagement with the engagement element. During a movement of the securing element from the release position into the securing position, the securing element can be moved in a first direction, and the engagement element is designed to pass the securing element arranged in the securing position starting from the first damping position. During the passing, the securing element can be moved by the engagement element in a second direction, which is oriented orthogonally to the first direction.

To transfer the damping device from a first damping position into a second damping position, it is necessary to bring the securing element into engagement with the engagement element. For this, in a first step, the securing element is moved in a first direction from a release position into a securing position. In a second step, the securing element can then be passed by the engagement element, wherein during the passing the securing element is moved by the engagement element in a second direction, which is oriented orthogonally to the first direction. Securing element and engagement element are thereby located in a position in which they are in engagement with each other.

It is thereby possible in a simple manner to transfer a damping device from a first damping position into a second damping position.

With respect to fittings which are to be as little visible as possible, during a movement of the securing element from the release position into the securing position, the securing element can be moved in a first direction. The engagement element is designed to pass the securing element arranged in the securing position starting from the first damping position, and during the passing the securing element can be moved by the engagement element in a second direction, which is oriented orthogonally to the first direction.

This also makes it possible in the case of this new type of fitting, to transfer the damping device from a first damping position into a second damping position and thus to adjust the required damping performance.

With respect to a piece of furniture, the piece of furniture comprises a pivoting element, a stationary support and at least one such fitting. The pivoting element is designed in the form of a movable furniture part and the stationary support is designed in the form of a furniture carcass.

The securing device has an actuating element, which can preferably be actuated toollessly, to actuate the securing device.

In particular, if the actuating element can also be actuated toollessly, this represents a simple possibility for a user to transfer a damping device from a first damping position into a second damping position. However, it is also conceivable in principle for the actuating element to be able to be actuated via a tool, such as for example a screwdriver.

In an embodiment of the invention, the actuating element can be actuated by displacing the actuating element, preferably in a direction orthogonal to the first direction and/or orthogonal to the second direction.

This represents a simple actuation method for a user. Moreover, it is also easy to ascertain whether the actuation device has been actuated or not. It is also conceivable for the actuating element to be actuated by another method, for example by turning.

A deflection device can be provided which converts a movement of the actuating element into a movement of the securing element in a first direction.

For this, the deflection device can preferably be designed in the form of a guide groove, and preferably the guide groove is at an angle of between 30° and 55°, preferably an angle of 45°, relative to the first direction.

This represents a simple possibility for implementing a deflection device. Naturally, other forms of a deflection device are also conceivable here. In particular, a deflection device can also be chosen according to the actuation method of the actuating element.

In a closed position of the fitting, the actuating element is covered by the first fitting part or the second fitting part. This contributes to a visually attractive overall impression of the fitting, even in positions other than the closed position.

Preferably, the fitting has a closing device which, at least from a defined position of the two fitting parts relative to each other, automatically transfers the fitting into a closed position of the fitting.

It is thereby ensured that a closing procedure is always carried out or completed correctly and a fitting is also actually closed. Moreover, such a closing device facilitates the use of a piece of furniture or similar with such a fitting.

Preferably, the closing device has an energy store, preferably a spring, particularly preferably a compression spring. Via the energy store, a force which is necessary to transfer the fitting into a closed position can be provided.

In addition, the closing device can have a deflection lever, wherein a deflection roller is arranged on the deflection lever.

Preferably, the energy store is designed to apply a force to the deflection lever. Accordingly, a force provided by the energy store can be deflected via the deflection lever and the deflection roller in order to provide the force at a specified position.

According to an embodiment of the invention, the energy store and the damping device can be arranged substantially parallel to each other in respect of their longitudinal extent.

A space-saving arrangement of the energy store and the damping device is thereby made possible. This favors a small design size of a fitting.

The same also applies if the closing device is arranged in the first fitting part.

The fitting can have at least one first pivot lever and at least one second pivot lever, wherein the two pivot levers are pivotably mounted at a first point on the first fitting part and at a second point on the second fitting part respectively.

For one thing, the two fitting parts are thereby pivotably connected to each other. For another, through the two pivot levers a trajectory is defined along which the second fitting part is pivotable relative to the first fitting part.

Preferably, the first pivot lever has a contact section via which the first pivot lever can be brought into contact with the damping device.

This represents a simple possibility for realizing a damping of a pivoting movement of the two fitting parts relative to each other.

Preferably, the first pivot lever has a control contour along which the deflection roller can travel.

Via the deflection lever, the deflection roller and the control contour, a force made available by the energy store can be applied to the first pivot lever such that a closing device can be easily realized.

Since both the contact section and the control contour are provided on the first pivot lever, only one pivot lever has a somewhat more complicated shape. Overall, however, a fitting thereby becomes less complex, which in turn results in less production effort and lower production costs.

The damping device can be designed in the form of a linear damper. This represents a simple and space-saving possibility for implementing a damping device. However, it is also conceivable for other dampers, such as for example rotary dampers, to be used.

The damping device can have a travel path of between 10 mm and 15 mm, preferably 12 mm. Such a travel path is large enough on the one hand to ensure the best possible damping and small enough on the other not to take up too much space.

In an embodiment of the invention, the damping device can be designed as a spring damper, gas pressure damper, and/or hydraulic damper. Other types of damper are also conceivable.

The damping device can also have a housing.

Particularly preferably, the engagement element is designed in one piece the steps with housing. Manufacturing for manufacturing a separate engagement element and thus also costs can thereby be reduced.

Particularly preferably, the engagement element is designed in the form of a preferably cuboidal projection. This represents the simplest possibility for implementing an engagement element.

It is also conceivable that the engagement element has a beveled area or similar in order to facilitate a passing of the securing element.

Preferably, the securing element can be designed elastic. The securing element, when being passed by the engagement element, can thereby be moved by purely elastic deformation in a second direction which is oriented orthogonally to the first direction.

According to an embodiment of the invention, the securing element can have an area beveled on at least one side, preferably on two sides, in which the securing element can be passed by the engagement element.

This facilitates the passing of the securing element by the engagement element.

With respect to a piece of furniture, the first fitting part is preferably arranged completely in a panel of the support. This favors a visually attractive appearance of the piece of furniture.

The second fitting part can preferably be arranged completely in the pivoting element. This favors a visually attractive appearance of the piece of furniture.

Particularly preferably, at least two fittings are provided. A particularly stable connection of pivoting element and stationary support can thereby be ensured.

BRIEF DESCRIPTION OF THE DRAWINGS

Further details and advantages of the invention are explained in more detail below with the aid of the description of the drawings, in which.

DETAILED DESCRIPTION OF THE INVENTION

Figure 1:
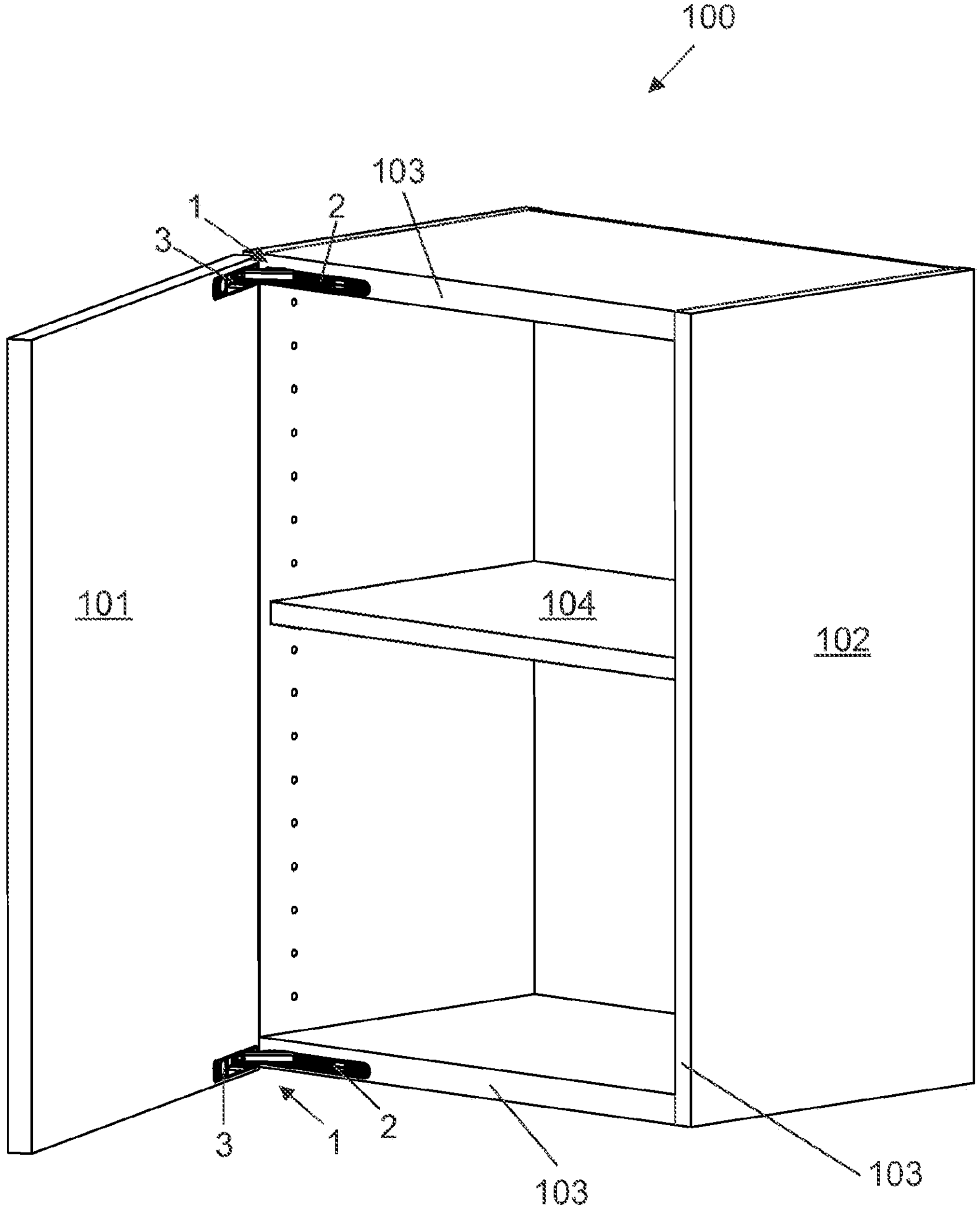
FIG. 1 is a perspective view of a piece of furniture.

FIG. 1 shows a perspective view of a piece of furniture 100. It can be seen that the piece of furniture 100 has a stationary support 102 in the form of a furniture carcass. The stationary support consists of several panels 103 which are arranged substantially vertical or horizontal.

In this embodiment, two fittings 1 can be seen, wherein the first fitting parts 2 of the fittings 1 are each arranged substantially completely in a horizontally aligned panel 103. The second fitting parts 3 of the fittings 1 are each arranged substantially completely in a pivoting element 101, here in the form of a furniture door.

For example, shelves 104 can be arranged inside the piece of furniture.

It also follows from FIG. 1 that, in the present embodiment, the fittings 1 can scarcely be seen, due to their specific design and arrangement. Substantially only the end faces of the fitting parts 2, 3 can be seen, which results in a visually attractive appearance of the piece of furniture 100.

Figure 2A:
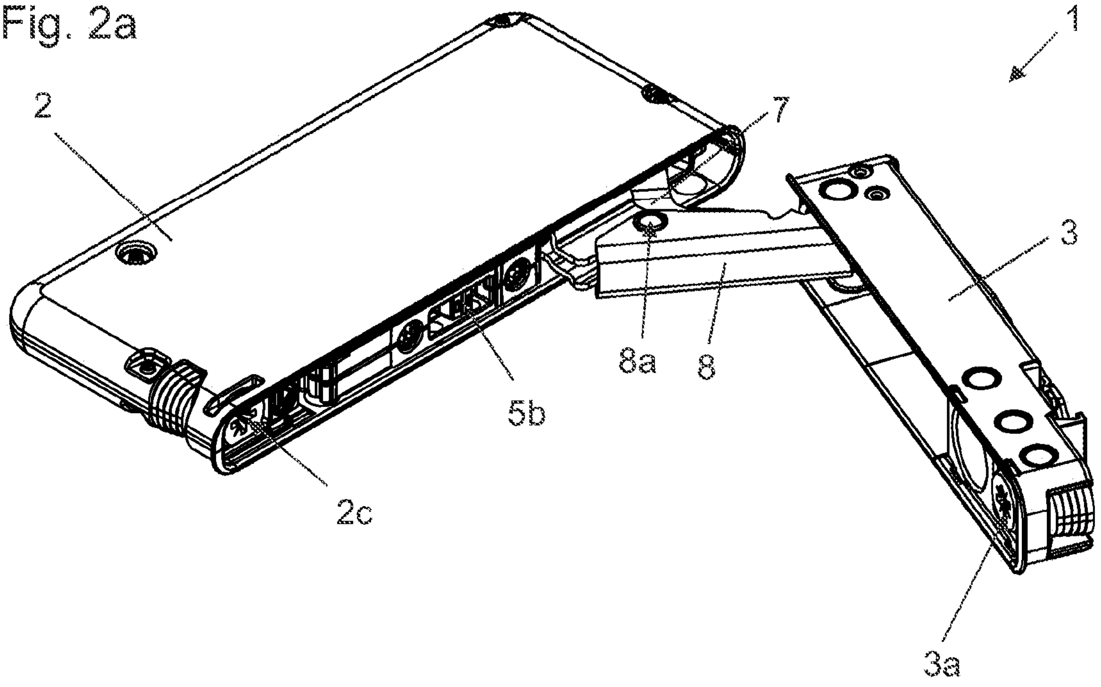
FIG. 2*a* is a perspective view of a fitting.
Figure 2B:
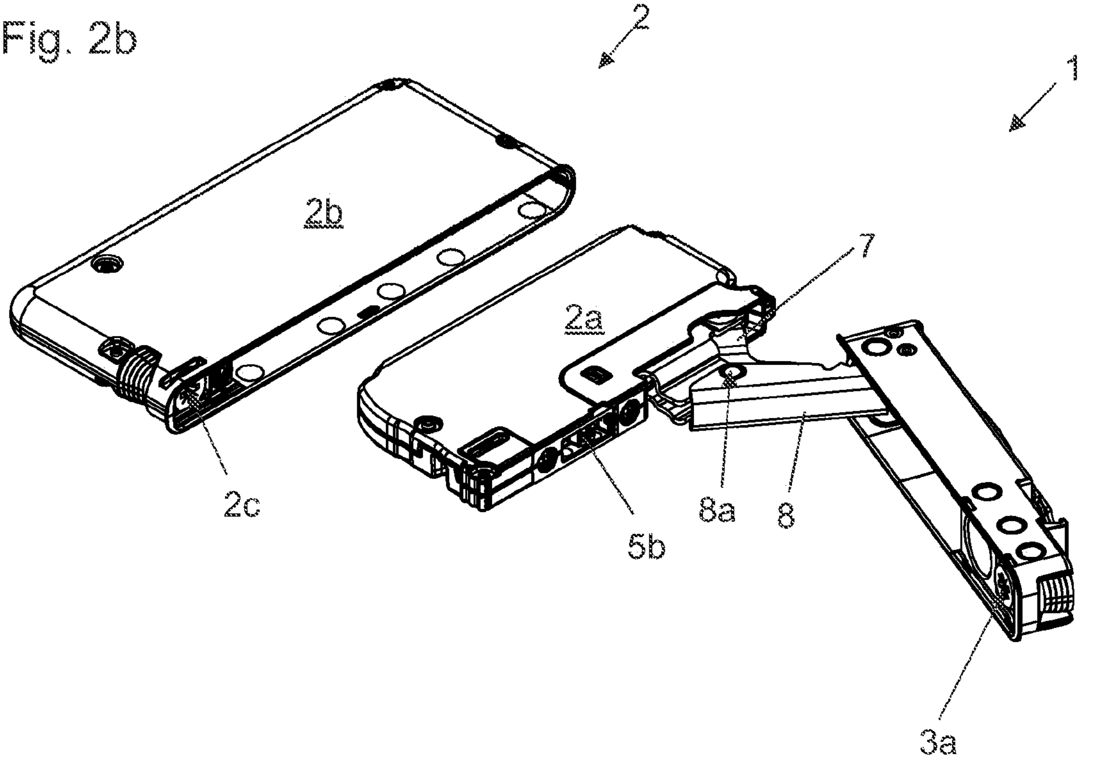
FIG. 2*b* is a perspective view of a fitting in a partly exploded representation.

FIG. 2*a* shows a perspective view of a fitting 1, FIG. 2*b* shows a corresponding partly exploded representation.

It can be seen that the first fitting part 2 is designed in two parts. An installation part 2*b* can be inserted into a recess in a panel 103. The installation part 2*b* can then be fastened in the recess via a fastening device 2*c*.

In the present embodiment, this is effected by turning an actuating element of the fastening device 2*c*. This results in a clamping element of the fastening device 2*c* being turned, as a result of which the installation part 2*b* is clamped in the recess of the panel 103.

The hinge element 2*a* can be inserted into the installation part 2*b* and releasably locked in same.

It can be seen that an actuating element 5*b* of a securing device 5 is arranged on the end face, which remains visible in an installed state of the fitting 1.

The pivot levers 7 and 8 also lie substantially in a plane with the first fitting part 2. This also applies to the second fitting part 3. However, it also conceivable here that the first fitting part 2 and the second fitting part 3 lie in planes that are turned relative to each other, in particular planes turned by 90° relative to each other.

A fastening device 3*a*, which functions substantially according to the same principle as the fastening device 2*c* of the first fitting part 2, is also arranged on the second fitting part 3.

Figure 3A:
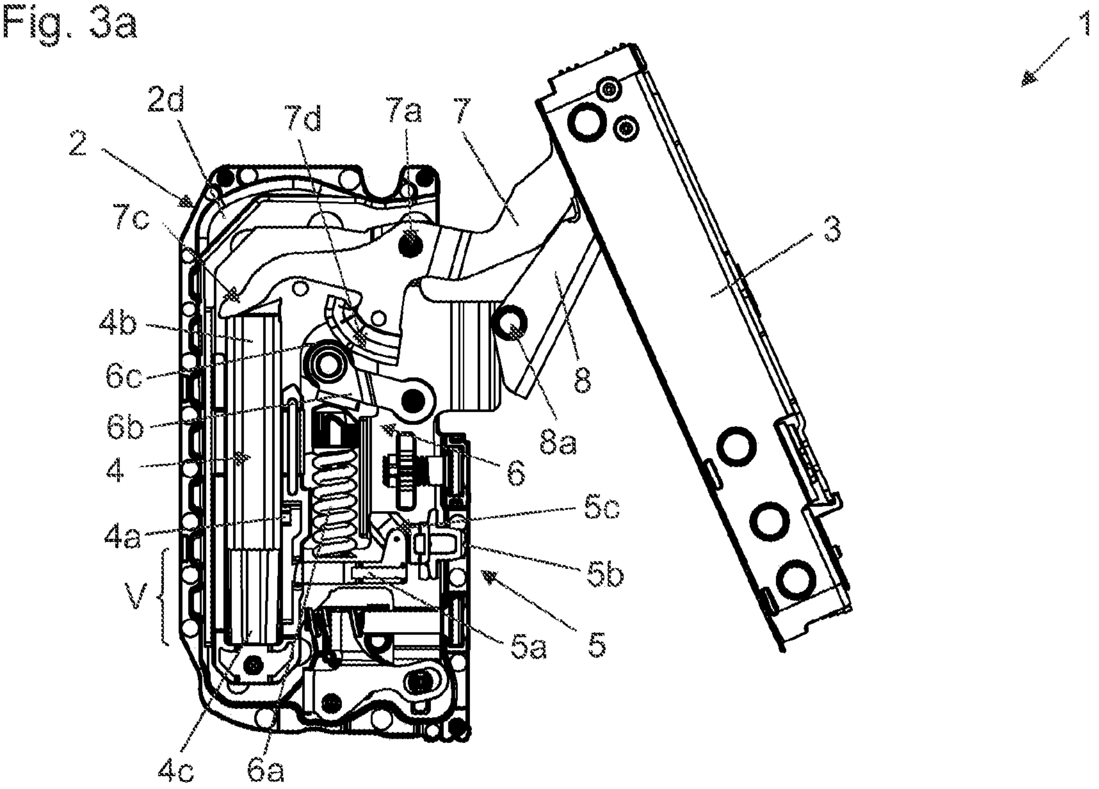
FIG. 3*a* is a top view of a fitting in a first damping position.
Figure 3B:
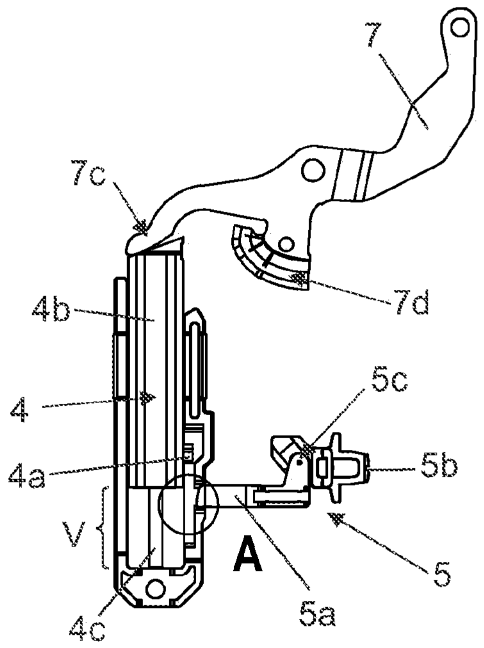
FIG. 3*b* is a top view of a damping device in a first damping position.
Figure 3C:
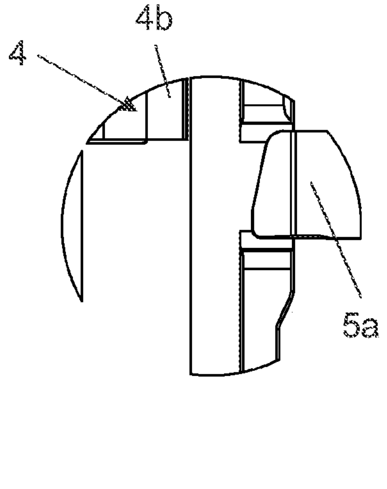
FIG. 3*c* shows the detail A of FIG. 3*b*.

FIG. 3*a* shows a top view of a fitting 1 in a first damping position, FIG. 3*b* shows a corresponding top view of a damping device 4 and FIG. 3*c* shows the detail A of FIG. 3*b*.

The installation part 2*b* as well as a cover of the hinge part 2*a* are not represented in this figure, in order to allow a view into the interior of the hinge part 2*a*.

A damping device 4 comprises a housing 4*b* and a piston rod 4*c*. The piston rod 4*c* is arranged on a base plate 2*d* of the first fitting part 2, the housing 4*b* can move damped along the piston rod 4*c*.

The damping of a movement of the housing 4*b* along the piston rod 4*c*, for example via a spring or a fluid, is effected inside the housing 4*b*.

The housing 4*b* can be contacted via a contact section 7*c* of the first pivot lever 7. The first pivot lever 7 is pivotably connected at a first point 7*a* to the first fitting part 2 and at a second, not visible, point to the second fitting part 3.

The second pivot lever 8 is also pivotably connected at a first point 8*a* to the first fitting part 2 and at a second, not visible, point to the second fitting part 3.

Because of the different design of the pivot levers 7, 8, the contact section 7*c* comes into contact with the housing 4*b* of the damper 4 from a defined angle of closing between first fitting part 2 and second fitting part 3 (in FIG. 3*b*, this angle of closing has not yet been reached, and accordingly the contact section 7*c* is not yet in contact with the housing 4*b*).

If the fitting 1 is closed further, i.e. the angle of closing is reduced, the contact section 7*c* moves in the direction of the housing 4*b* and moves the housing 4*b* in the direction of the piston rod 4*c*. This movement is damped by the damping device 4, and accordingly the closing movement is also damped.

In the first damping position, a complete travel path V of the damping element 4 is available for damping.

It can be seen that a securing device 5 is not actuated. Consequently, a securing element 5*a* has not been moved in a direction into a securing position. The housing 4*b* can thereby travel unhindered along the whole travel path V along the piston rod 4*c*.

Moreover, the first pivot lever 7 also has a control contour 7*d*. The control contour 7*d* is contacted by a deflection roller 6*c* of a closing device 6.

The deflection roller 6*c* is mounted on a deflection lever 6*b* to which a force is applied from an energy store 6*a* in the form of a compression spring. The deflection roller 6*c* is thus pressed against the control contour 7*d*.

Through a movement of the second fitting part 3, the control contour 7*d* travels along the roller 6*c*. From a specific angle of closing of the fitting 1, the roller 6*c* is located in a section of the control contour 7*d* in which the force exerted on the control contour 7*d* through the deflection roller 6*c* results in the deflection lever 7 being pivoted. This has the result that, through this pivoting movement, the first pivot lever 7 moves the second fitting part 3 in the direction of a closed position of the fitting 1.

It can also be seen that an engagement element 4*a* in the form of a projection is formed on the housing 4*b*.

Figure 4A:
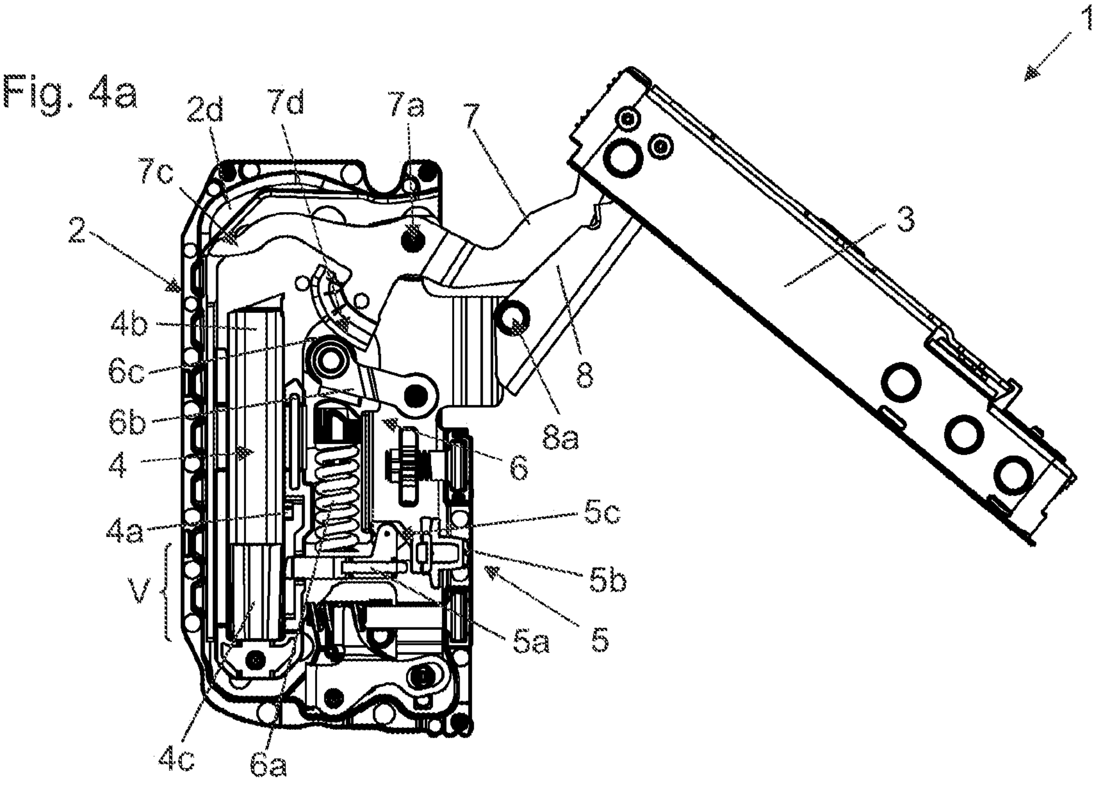
FIG. 4*a* is a top view of a fitting during a first step during the transfer of the fitting from a first into a second damping position.
Figure 4B:
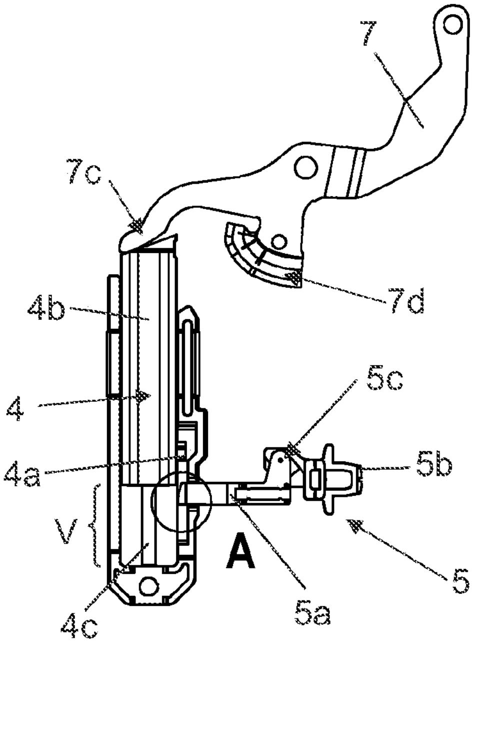
FIG. 4*b* is a top view of a damping device during a first step during the transfer of the fitting from a first into a second damping position.
Figure 4C:
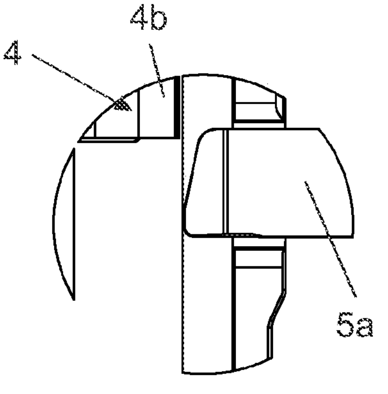
FIG. 4*c* shows the detail A of FIG. 4*b*.

FIG. 4*a* shows a top view of a fitting 1 during a first step during the transfer of the fitting 1 from a first into a second damping position, FIG. 4*b* shows a corresponding top view of a damping device 4 and FIG. 4*c* shows the detail A of FIG. 4*b*.

It can be seen that the actuating element 5*b* of the securing device 5 is actuated. Through the actuation of the actuating element 5*b*, the securing element 5*a* is moved in a first direction and thus transferred into a securing position.

The conversion of the movement of the actuating element 5*b* into a movement of the securing element 5*a* is effected via a deflection device 5*c*. In the present embodiment, the deflection device comprises a guide groove in which the securing element 5*a* is displaceably mounted.

The guide groove is arranged at an angle of 45° to a movement direction of the actuating element 5*b*. The securing element 5*a* is movable only in a first direction, which is parallel to a longitudinal extent of the securing element 5*a*. A movement of the actuating element 5*b* thus results in a movement of the securing element 5*a* in the first direction.

In this step, the securing element 5*a* has been moved in the direction of (toward) the damping device 4.

Figure 5A:
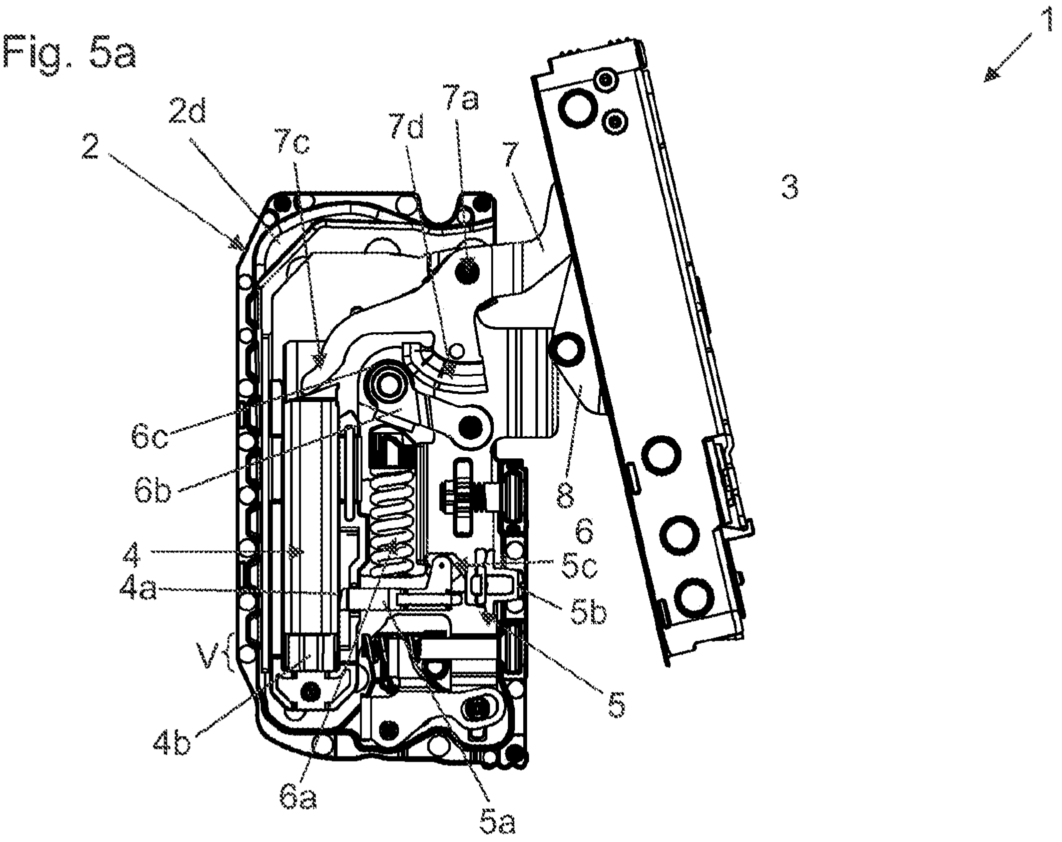
FIG. 5*a* is a top view of a fitting during a passing of a securing element by an engagement element.

FIG. 5*a* shows a top view of a fitting during a passing of a securing element 5*a* by an engagement element 4*a*, FIG.

Figure 5B:
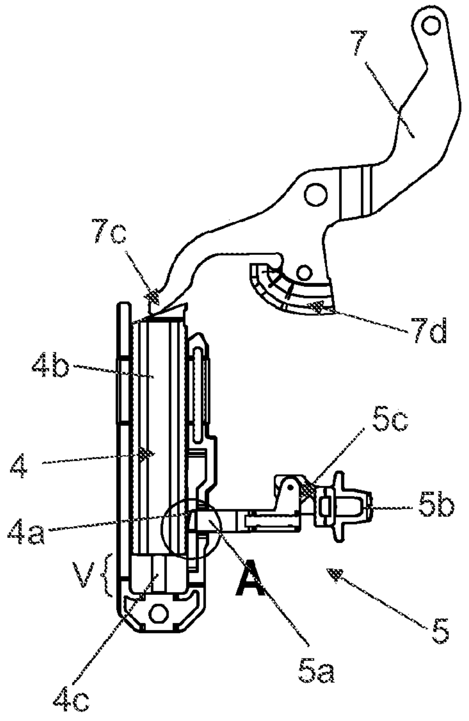
FIG. 5*b* is a top view of a damping device during a passing of a securing element by an engagement element.
Figure 5C:
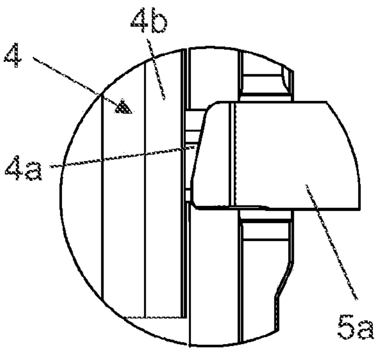
FIG. 5*c* shows the detail A of FIG. 5*b*.

5*b* shows a corresponding top view of a damping device 4 and FIG. 5*c* shows the detail A of FIG. 5*b*.

It can be seen that the housing 4*b* has been moved in the direction of the piston rod 4*c*, as a result of which the engagement element 4*a* has also been moved in the direction of the securing element 5*a*.

During the passing of the securing element 5*a*, the engagement element 4*a* moves (deflects) the securing element 5*a* in a second direction, upwards in the present case (i.e., out of the page in FIG. 5*c*) to pass "underneath" the securing element 5*a*. In this embodiment, the second direction is thus oriented both orthogonally to a first direction (which is parallel to the longitudinal extent of the securing element 5*a*) and orthogonally to an actuating direction of the actuating element 5*b*.

The securing element 5*a* can be beveled in an area in which it can be passed by the engagement element 4*a*, in order to facilitate a corresponding passing. The engagement element 4*a* can also be beveled, at least in areas, in order to facilitate a passing.

Moreover, the securing element 5*a* is designed elastic, at least in areas, in order to implement a passing by the engagement element 4*a* easily.

Figure 6A:
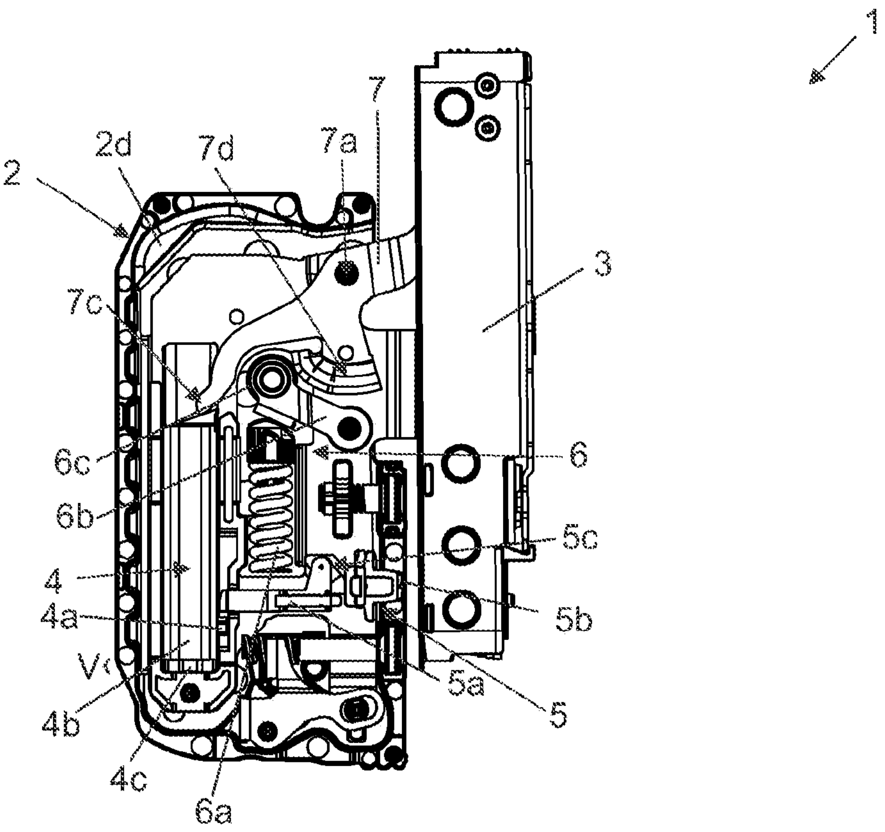
FIG. 6*a* is a top view of a fitting during a second step during the transfer of the fitting from a first into a second damping position.
Figure 6B:
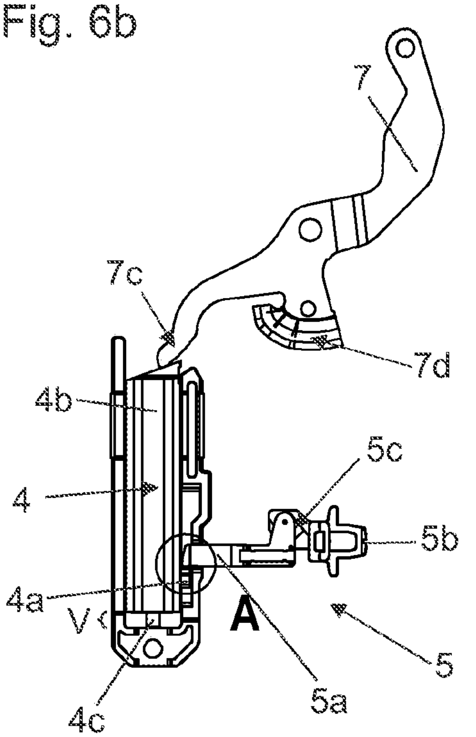
FIG. 6*b* is a top view of a damping device during a second step during the transfer of the fitting from a first into a second damping position.
Figure 6C:
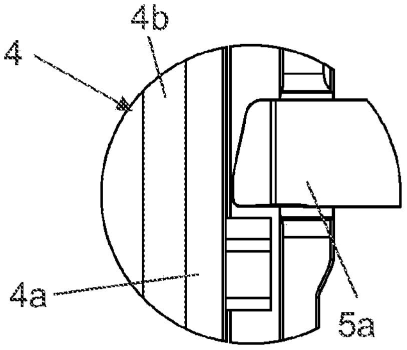
FIG. 6*c* shows the detail A of FIG. 6*b*.

FIG. 6*a* shows a top view of a fitting 1 during a second step during the transfer of the fitting 1 from a first into a second damping position, FIG. 6*b* shows a corresponding top view of a damping device 4 and FIG. 6*c* shows the detail A of FIG. 6*b*.

It can be seen that the securing element 5*a* has been completely passed by the engagement element 4*a*. The housing 4*b* has been moved most of the way along the travel path V along the piston rods 4*c*.

It can also be seen that the engagement element 4*a* is not yet in engagement with the securing element 5*a*.

Figure 7A:
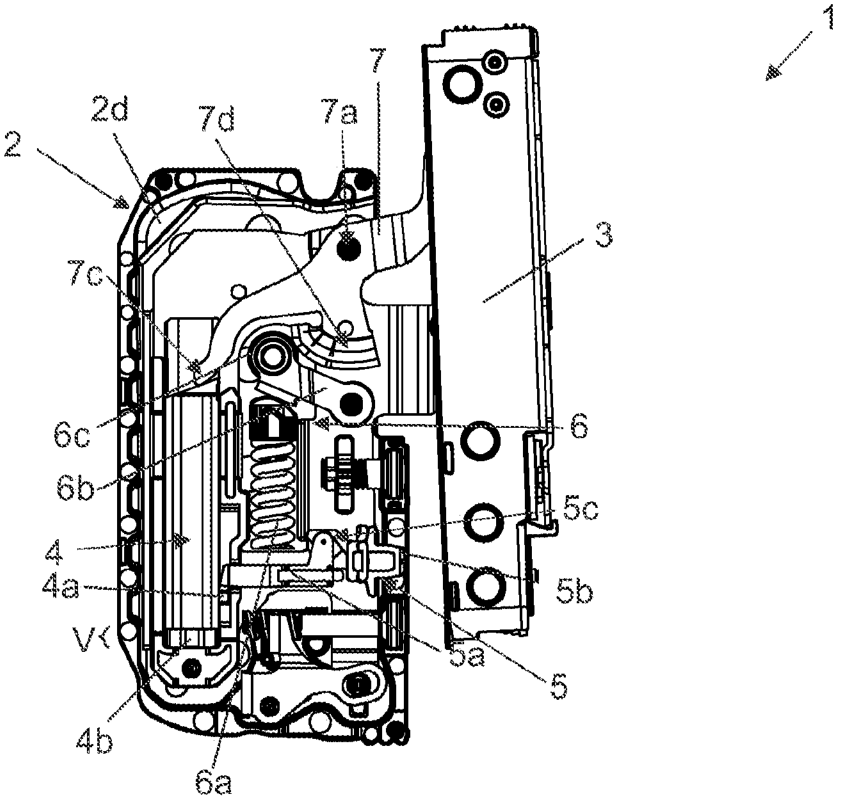
FIG. 7*a* is a top view of a fitting in a second damping position.
Figure 7B:
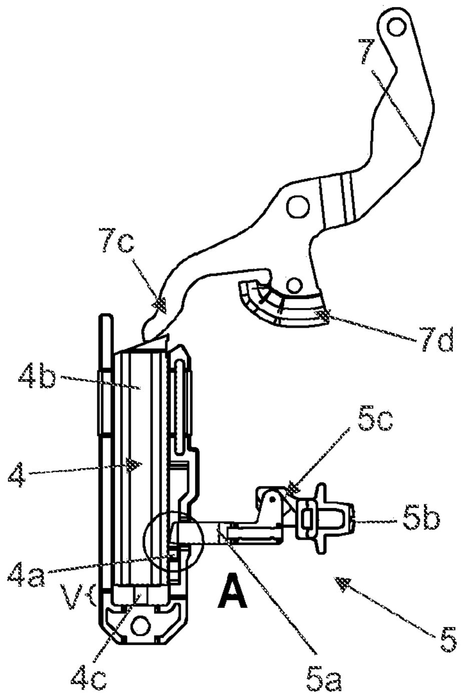
FIG. 7*b* is a top view of a damping device in a second damping position.
Figure 7C:
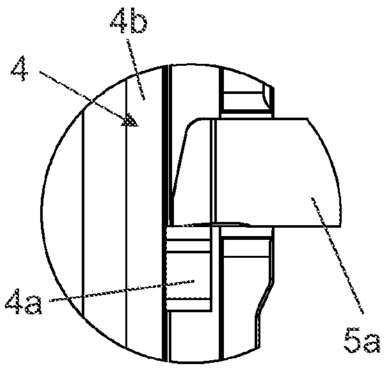
FIG. 7*c* shows the detail A of FIG. 7*b*.

FIG. 7*a* shows a top view of a fitting 1 during a second step during the transfer of the fitting 1 from a second damping position, FIG. 7*b* shows a corresponding top view of a damping device 4 and FIG. 7*c* shows the detail A of FIG. 7*b*.

It can be seen that the engagement element 4*a* is now in engagement with the securing element 5*a*. The housing 4*b* is thus greatly restricted in its travel path V. A damping of a closing movement of the fitting 1 can thus now only be effected on the restricted travel path V. The damping performance is thus reduced relative to the first damping position. In other words, as shown in FIG. 7*c*, the securing element 5*a* of the securing device 5 blocks movement of the damping device 4 to thereby hold the damping device 4 in the second damping position with the reduced damping performance.

In order to transfer the damping device 4 back into the first damping position, it is merely necessary to actuate the actuating element 5*b*. The securing element is thereby moved back into a release position. The engagement element 4*a* is then no longer in engagement with the securing element 5*a*, as a result of which the complete travel path V is again available to the damping device 4.

LIST OF REFERENCE NUMBERS

- 1 fitting
- 2 first fitting part
  - 2*a* hinge element
  - 2*b* installation part
  - 2*c* fastening device
  - 2*d* base plate
- 3 second fitting part
  - 3*a* fastening device
- 4 damping device
  - 4*a* engagement element
  - 4*b* housing
  - 4*c* piston rod
- 5 securing device
  - 5*a* securing element
  - 5*b* actuating element
  - 5*c* deflection device
- 6 closing device
  - 6*a* energy store
  - 6*b* deflection lever
  - 6*c* deflection roller
- 7 first pivot lever
  - 7*a* first point
  - 7*c* contact section
  - 7*d* control contour
- 8 second pivot lever
  - 8*a* first point
- 100 piece of furniture
- 101 pivoting element
- 102 stationary support
- 103 panel
- 104 shelf
- V travel path

The invention claimed is:

1. A fitting for movably mounting a pivoting element relative to a stationary support, the fitting comprising:

a first substantially cuboidal fitting part to be arranged substantially completely in a recess in an end face of a substantially horizontally or vertically aligned panel of the stationary support, a second fitting part to be fastened on the pivoting element, the second fitting part being connected pivotably to the first fitting part, and configured to be arranged substantially completely in the pivoting element, a damping device for damping a pivoting movement of the first fitting part relative to the second fitting part, a first pivot lever having a contact section configured to be intermittently brought into contact with the damping device to effect damping between the first fitting part and the second fitting part, a second pivot lever, each of the first pivot lever and the second pivot lever being pivotably mounted to each of the first fitting part and the second fitting part, and a securing device, wherein the damping device is configured to be transferred from a first damping position into a second damping position having a reduced damping performance relative to the first damping position, and wherein the damping device is arranged in the first fitting part, and the securing device is configured to intermittently block a movement of the damping device to hold the damping device in the second damping position.

2. The fitting according to claim 1, wherein the damping device includes an engagement element and the securing device includes a securing element configured to be arranged in a release position, in which the securing element is spaced apart from the engagement element, and arranged in a securing position, in which the securing element engages the engagement element, and wherein the securing device and the damping device are configured such that, during a movement of the securing element from the release position into the securing position, the securing element is moved in a first direction, and the engagement element is configured to pass the securing element arranged in the securing position starting from the first damping position, wherein the securing element is deflectable by the engagement element in a second direction orthogonal to the first direction when being passed by the engagement element.

3. The fitting according to claim 2, wherein the securing device includes an actuating element configured to actuate the securing device, and the securing device includes a deflection device configured to convert a movement of the actuating element into a movement of the securing element in the first direction.

4. The fitting according to claim 3, wherein the deflection device comprises a guide groove.

5. The fitting according to claim 4, wherein the guide groove extends at an angle of between 30° and 55° relative to the first direction.

6. The fitting according to claim 2, wherein the damping device includes a housing, and the engagement element is integrally formed with the housing to have a one piece construction with the housing.

7. The fitting according to claim 2, wherein the engagement element comprises a projection.

8. The fitting according to claim 7, wherein the projection is cuboidal.

9. The fitting according to claim 2, wherein the securing element of the securing device is configured to intermittently block the movement of the damping device, the securing element having a beveled area on at least one side so that the securing element is passable by the engagement element.

10. The fitting according to claim 9, wherein the securing element has the beveled area on two sides.

11. The fitting according to claim 2, wherein the securing device includes an actuating element configured to actuate the securing device, the actuating element is configured to be displaced in a direction orthogonal to the first direction and/or orthogonal to the second direction to be actuated.

12. The fitting according to claim 1, wherein the securing device includes an actuating element configured to actuate the securing device.

13. The fitting according to claim 12, wherein the actuating element is configured to be actuated by being displaced.

14. The fitting according to claim 12, wherein the actuating element is covered by the first fitting part or the second fitting part when the fitting is in a closed position.

15. The fitting according to claim 12, wherein the actuating element is configured to be actuated without a tool to actuate the securing device.

16. The fitting according to claim 1, further comprising a closing device configured to automatically transfer the fitting into a closed position of the fitting from a defined position of the two fitting parts relative to each other.

17. The fitting according to claim 16, wherein the closing device includes an energy storage device.

18. The fitting according to claim 17, wherein the energy storage device is configured to apply a force to a deflection lever of the closing device.

19. The fitting according to claim 17, wherein the energy storage device and the damping device are arranged substantially parallel to each other with respect to their longitudinal axes.

20. The fitting according to claim 17, wherein the energy storage device is a compression spring.

21. The fitting according to claim 16, wherein the closing device includes a deflection lever, and a deflection roller is arranged on the deflection lever.

22. The fitting according to claim 21, wherein the first pivot lever has a control contour, and the deflection roller is configured to travel along the control contour.

23. The fitting according to claim 16, wherein the closing device is arranged in the first fitting part.

24. The fitting according to claim 1, wherein the damping device comprises a linear damper.

25. The fitting according to claim 24, wherein the damping device has a travel path of between 10 mm and 15 mm.

26. The fitting according to claim 25, wherein the damping device has a travel path of 12 mm.

27. The fitting according to claim 1, wherein the damping device is a spring damper, a gas pressure damper, and/or a hydraulic damper.

28. The fitting according to claim 1, wherein the damping device includes a housing.

29. The fitting according to claim 1, wherein the securing device includes an at least partially elastic securing element to intermittently block the movement of the damping device.

30. A piece of furniture comprising:

a pivoting element, a stationary support, and the fitting according to claim 1, wherein the pivoting element is a movable furniture part and the stationary support is a furniture carcass pivotally connected to the movable furniture part by the fitting.

31. The piece of furniture according to claim 30, wherein the first fitting part of the fitting is arranged completely in a panel of the stationary support.

32. The piece of furniture according to claim 30, wherein the second fitting part of the fitting is arranged completely in the pivoting element.

33. The piece of furniture according to claim 30, wherein the fitting is one of at least two fittings.

34. The fitting according to claim 1, wherein the damping device is configured to damp a closing pivoting movement of the first fitting part relative to the second fitting part.

* * * * *